(12) United States Patent
Mitsuhashi et al.

(10) Patent No.: US 11,951,824 B2
(45) Date of Patent: Apr. 9, 2024

(54) SHUTTER DEVICE FOR VEHICLE

(71) Applicant: DENSO CORPORATION, Kariya (JP)

(72) Inventors: Takuya Mitsuhashi, Kariya (JP);
Yukio Shidara, Kariya (JP)

(73) Assignee: DENSO CORPORATION, Kariya (JP)

( * ) Notice: Subject to any disclaimer, the term of this patent is extended or adjusted under 35 U.S.C. 154(b) by 572 days.

(21) Appl. No.: 17/153,093

(22) Filed: Jan. 20, 2021

(65) Prior Publication Data

US 2021/0138892 A1   May 13, 2021

Related U.S. Application Data

(63) Continuation of application No. PCT/JP2019/025860, filed on Jun. 28, 2019.

(30) Foreign Application Priority Data

Jul. 26, 2018   (JP) ................................ 2018-139903

(51) Int. Cl.
*F01P 7/10*   (2006.01)
*B60K 11/04*   (2006.01)
*B60K 11/08*   (2006.01)

(52) U.S. Cl.
CPC ............ *B60K 11/04* (2013.01); *B60K 11/085* (2013.01)

(58) Field of Classification Search
CPC .............................. B60K 11/04; B60K 11/085

USPC .......................................................... 165/98
See application file for complete search history.

(56) References Cited

U.S. PATENT DOCUMENTS

2017/0080794 A1   3/2017   Yamamoto et al.

FOREIGN PATENT DOCUMENTS

| FR | 2906759 A1 * | 4/2008 |
| JP | 2015217827 A | 12/2015 |
| JP | 2016055719 A | 4/2016 |
| JP | 2017185991 A | 10/2017 |
| JP | 2019100389 A | 6/2019 |

OTHER PUBLICATIONS

U.S. Appl. No. 17/152,983, filed Jan. 20, 2021, Basmil Yenerdag et al.

* cited by examiner

*Primary Examiner* — Davis D Hwu
(74) *Attorney, Agent, or Firm* — Harness, Dickey & Pierce, P.L.C.

(57) ABSTRACT

A shutter device includes a frame member, a plurality of blades, an actuator device, and an auxiliary member. The frame member is formed in a casing shape, and air introduced from a front opening of the vehicle flows through an inside passage of the frame member. The blades are supported by the frame member in a rotatable manner, and open and close space within a casing of the frame member. The actuator device opens and closes the blades. Auxiliary member is assembled to the frame member to assist a blades supporting function of the frame member.

10 Claims, 16 Drawing Sheets

SHUTTER DEVICE FOR VEHICLE

CROSS REFERENCE TO RELATED APPLICATIONS

The present application is a continuation application of International Patent Application No. PCT/JP2019/025860 filed on Jun. 28, 2019, which designated the U.S. and claims the benefit of priority from Japanese Patent Application No. 2018-139903 filed in Japan filed on Jul. 26, 2018, the entire disclosure of the above application is incorporated herein by reference.

TECHNICAL FIELD

A present disclosure relates to a shutter device for a vehicle.

BACKGROUND

A vehicle uses air to dissipate heat from a heat exchanger. Devices are developed to control an amount of air. In one aspect, the air, especially traveling wind is strong enough to deform members. The devices to control the air is required to work properly even in such an environment. In the above aspects, or in other aspects not mentioned, there is a need for further improvements in a shutter device for a vehicle.

SUMMARY

A shutter device for a vehicle is disclosed. The shutter device comprises: a frame, a plurality of blades, an actuator device, and an auxiliary member. The frame member is formed in a casing shape, and air introduced from a front opening of the vehicle flows through space within the casing. The blades are supported by the frame member in a rotatable manner, and open and close space within a casing of the frame member. The actuator device opens and closes the blades. The auxiliary member is assembled to the frame member and assists supporting of the blades to the frame member.

According to this configuration, since the auxiliary member can assist a support of the blade with respect to the frame member, it is possible to prevent the blade from being disassembled from the frame member.

BRIEF DESCRIPTION OF DRAWINGS

The disclosure is further described with reference to the accompanying drawings in which.

DETAILED DESCRIPTION

Figure 1:
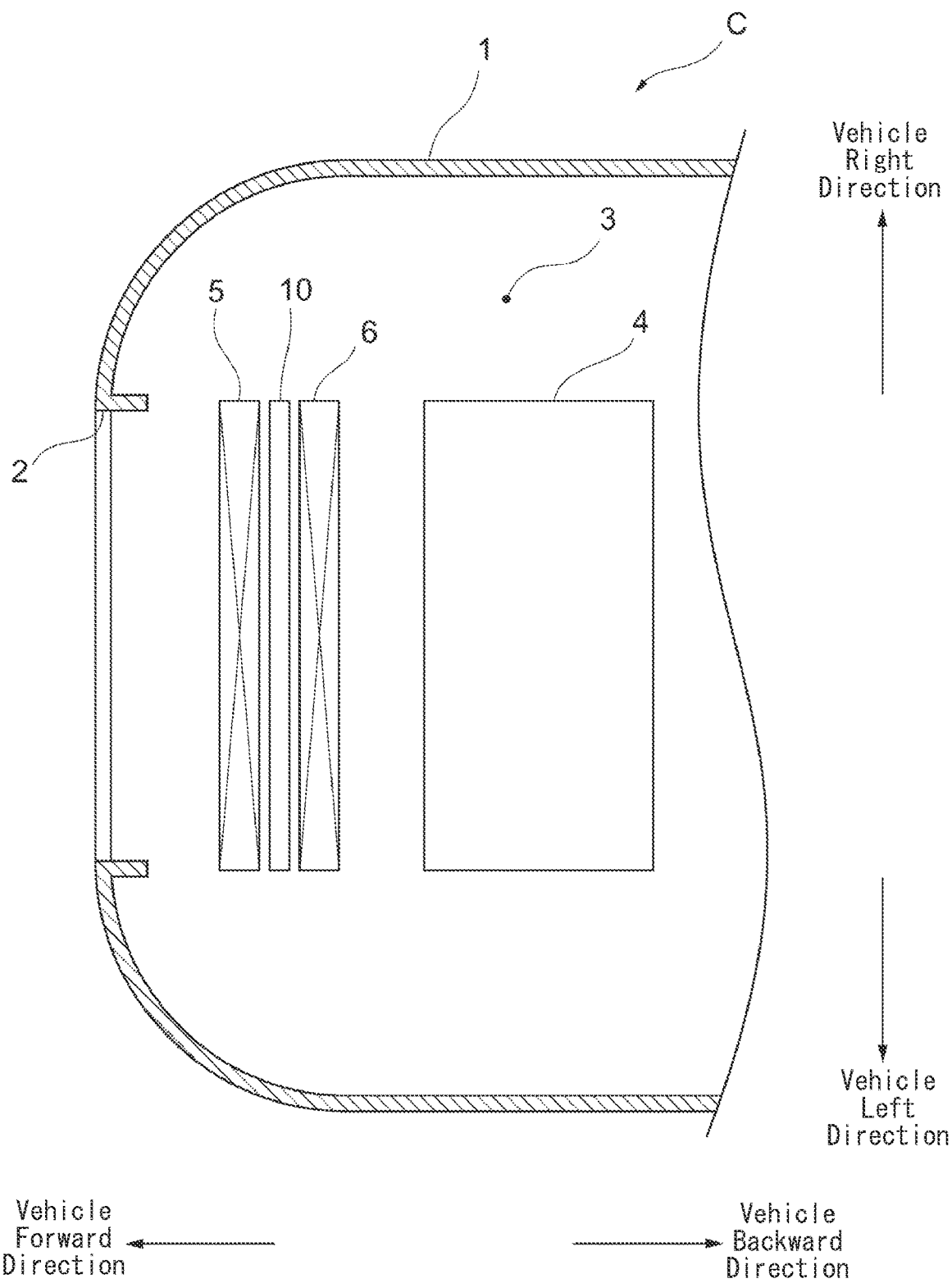
FIG. 1 is a diagram schematically showing a front part of a vehicle.

Hereinafter, embodiment of a vehicle shutter device are described with reference to the drawings. To facilitate understanding, identical constituent elements are designated with identical symbols in the drawings where possible with the duplicate description omitted.

A vehicle introduces air from a front opening to an engine room. The introduced air is used to dissipate heat from a radiator through which an engine cooling water flows or heat from a condenser of an air conditioner for a vehicle. A shutter device capable of temporarily blocking the air flow from the front opening to the engine room may be installed in such a vehicle.

JP2016-55719A discloses a shutter device which has a plurality of blades having a pair of shaft portions on both ends and a frame member supporting the shaft portions of the blades in a rotatable coupled manner. Each blade opens and closes by rotating around the shaft portions. In this shutter device, an air flow through the frame can pass when the plurality of blades are in an open state, and can be blocked when the plurality of blades are in a closed state.

In recent years, a space in an engine room has been reduced due to factors such as an increase in a number of devices installed in the engine room of the vehicle. Therefore, it is required to reduce mounting space of a shutter device of the vehicle. In order to achieve this demand, the inventors are considering that an arrangement in which the shutter device is arranged in a narrow gap between two heat exchangers such as a radiator and a condenser of an air conditioner. When arranging the shutter device in such a place, it is essential to reduce a thickness of the shutter device.

On the other hand, when the shutter device is in the closed state, a traveling wind of the vehicle hits the blade, so that a ram pressure is generated on the blade. When a strength of the frame member is reduced due to a thinning of the shutter device, a force applied to the blade by the ram pressure is transmitted to the frame member, so that the frame is easily deformed to a downstream side in the air flow direction. If the frame member is deformed downstream in the air flow direction, the blades may be disassembled from the frame member. Further, when the blade is deformed by the ram pressure, the blade may also be disassembled from the frame member. It is an object of the present disclosure to provide a vehicle shutter device capable of preventing the blade from being disassembled from the frame member.

First, a schematic configuration of a vehicle equipped with the shutter device of the embodiment is described.

As shown in FIG. 1, a front opening 2 is provided on a front of a body 1 of a vehicle C. Air in front of the body 1 is introduced into an engine room 3 of the vehicle C through the front opening 2. In the engine room 3, heat exchangers 5 and 6 such as a radiator and a condenser are arranged in addition to the engine 4 of the vehicle C. The radiator 5 dissipates heat from a cooling water for cooling the engine 4 by performing heat exchange between the cooling water and the air introduced from the front opening 2. The condenser 6 is a component of a refrigeration cycle for an air conditioner mounted on the vehicle C. The condenser 6 dissipates heat from a refrigerant by performing heat exchange between the refrigerant circulating in the refrigeration cycle and the air introduced from the front opening 2. The heat exchangers 5 and 6 are arranged between the front opening 2 and the engine 4.

A shutter device 10 capable of temporarily blocking the flow of air from the grill opening 2 to the engine room 3 is arranged between the heat exchangers 5 and 6. The shutter device 10 is arranged to provide several advantages. In one aspect, the shutter device 10 enables early warming up of the engine 4, for example, by temporarily blocking the air flow from the front opening 2 to the engine room 3 during a cold start of the engine 4. Further, the shutter device 10 improves an aerodynamic performance of the vehicle C by temporarily blocking the air flow from the front opening 2 to the engine room 3 when the vehicle C travels at high speed.

Next, the specific structure of the shutter device 10 is described.

Figure 2:
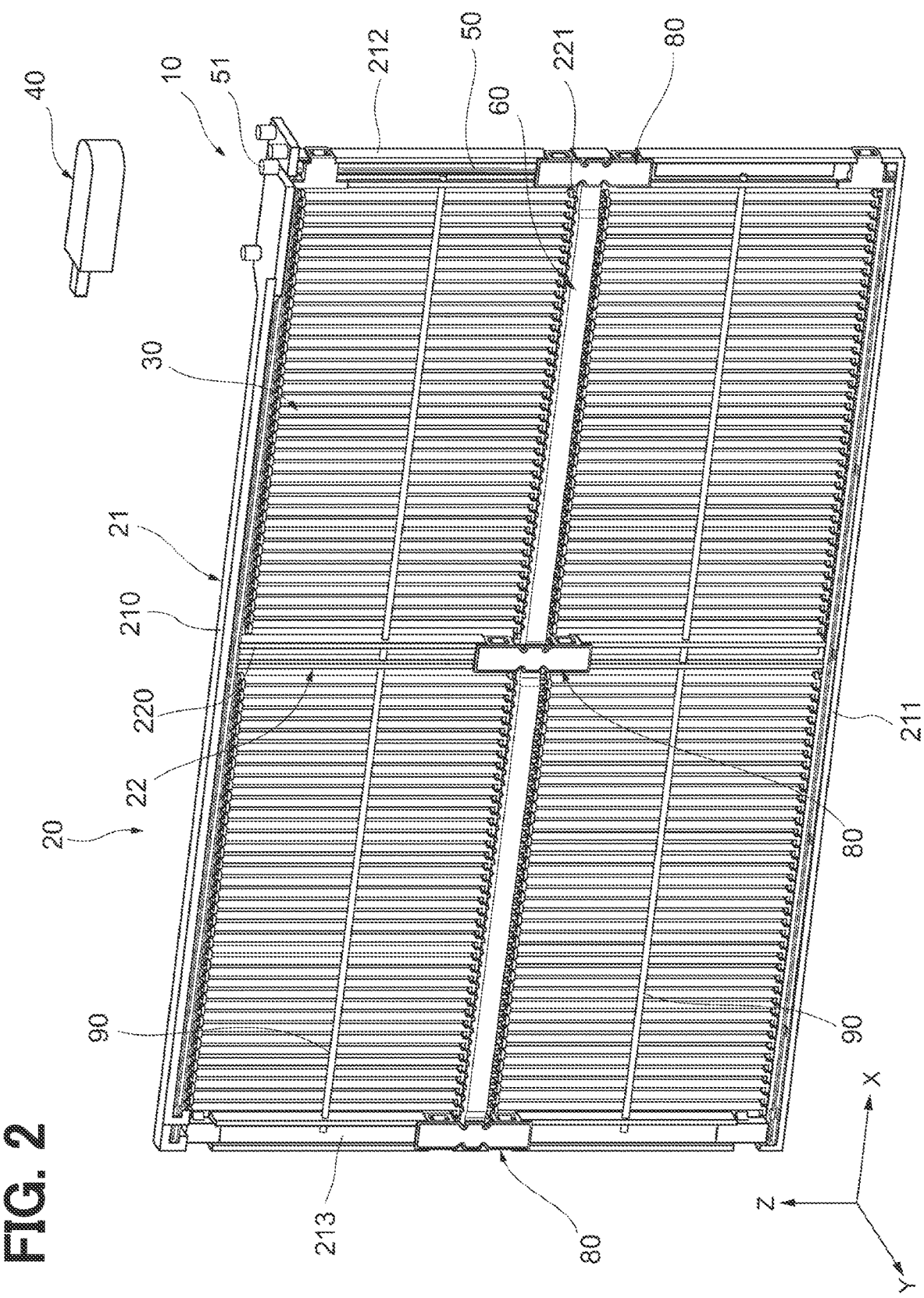
FIG. 2 is a perspective view showing a shutter device of an embodiment.

As shown in FIG. 2, the shutter device 10 includes a frame member 20, a plurality of blades 30, an actuator device 40, a shaft 50, and a link member 60.

The frame member 20 has a frame main body 21 formed in a square casing shape, and a reinforcing frame piece 22 for reinforcing the frame main body 21. The frame member 20 is made of, for example, a resin material.

The frame main body 21 has an upper frame piece 210, a lower frame piece 220, a right frame piece 212, and a left frame piece 213. The air introduced from the front opening 2 shown in FIG. 1 flows through space within a casing of the frame main body 21.

Hereinafter, the longitudinal directions of the upper frame piece 210 and the lower frame piece 211 are also referred to as an X axis direction, and the longitudinal directions of the right frame piece 212 and the left frame piece 213 are also referred to as a Z axis direction. In this embodiment, the Z axis direction corresponds to the vertical direction and a vehicle up and down direction. Further, a direction orthogonal to both the X axis direction and the Z axis direction is also referred to as a Y axis direction. Since the Y axis direction corresponds to the air flow direction, the Y axis direction is also referred to as an air flow direction Y.

The reinforcing frame piece 22 is arranged in a cross shape within the casing of the frame main body 21. The reinforcing frame piece 22 has a vertical reinforcing frame piece 220 and a lateral reinforcing frame piece 221. The vertical reinforcing frame piece 220 is provided so as to connect between central portions of the upper frame piece 210 and the lower frame piece 211. The lateral reinforcing frame piece 221 is provided so as to connect between central portions of the right frame piece 212 and the left frame piece 213. The reinforcing frame pieces 22 defines four regions within the casing of the frame member 20.

Figure 3:
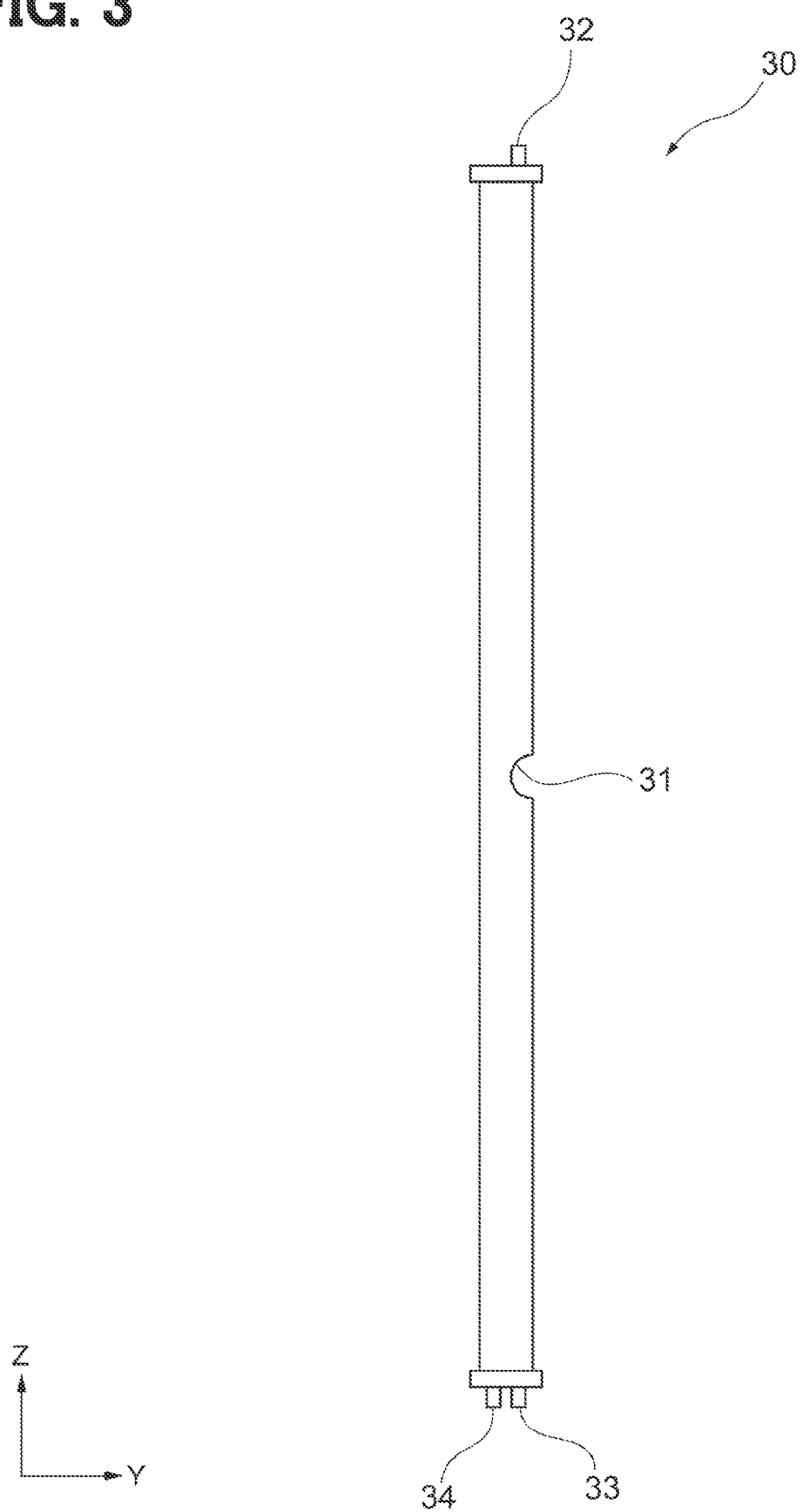
FIG. 3 is a side view showing a side structure of the blade of the embodiment.

As shown in FIG. 3, the blade 30 has shaft portions 32 and 33 at both ends in a longitudinal direction thereof, respectively. The shaft portions 32 and 33 are portions supported by the frame 20 in a rotatable manner. Further, the blade 30 has a connecting portion 34 at an end portion where the shaft portion 33 is formed. The connecting portion 34 is a portion to which the link member 60 is connected. The blade 30 opens and closes around the shaft portions 32 and 33 by a force applied to the connecting portion 34 via the link member 60. A notch shape 31 is formed on a central portion of the blade 30. In FIG. 2, the notch shapes 31 of the blades 30 are not shown.

As shown in FIG. 2, the plurality of blades 30 are arranged in four regions within the casing of the frame member 20. In the four regions within the casing of the frame member 20, the plurality of blades 30 are arranged so as to have a longitudinal direction in the Z axis direction and are arranged side by side in the X axis direction. The plurality of blades 30 includes the blades 30 arranged between the upper frame piece 210 and the lateral reinforcing frame piece 221 have the shaft portions 32 which are provided at upper ends thereof and are supported by the upper frame piece 210 in a rotatable manner, and the shaft portions 33 which are provided at lower ends thereof and are supported by the lateral reinforcing frame piece 221 in a rotatable manner. The plurality of blades 30 includes the blades 30 arranged between the lower frame piece 211 and the lateral reinforcing frame piece 221 have the shaft portions 33 which are provided at upper ends thereof and are supported by the lateral reinforcing frame piece 221 in a rotatable manner, and the shaft portions 32 which are provided at lower ends thereof and are supported by the upper frame piece 210 in a rotatable manner.

Figure 4:
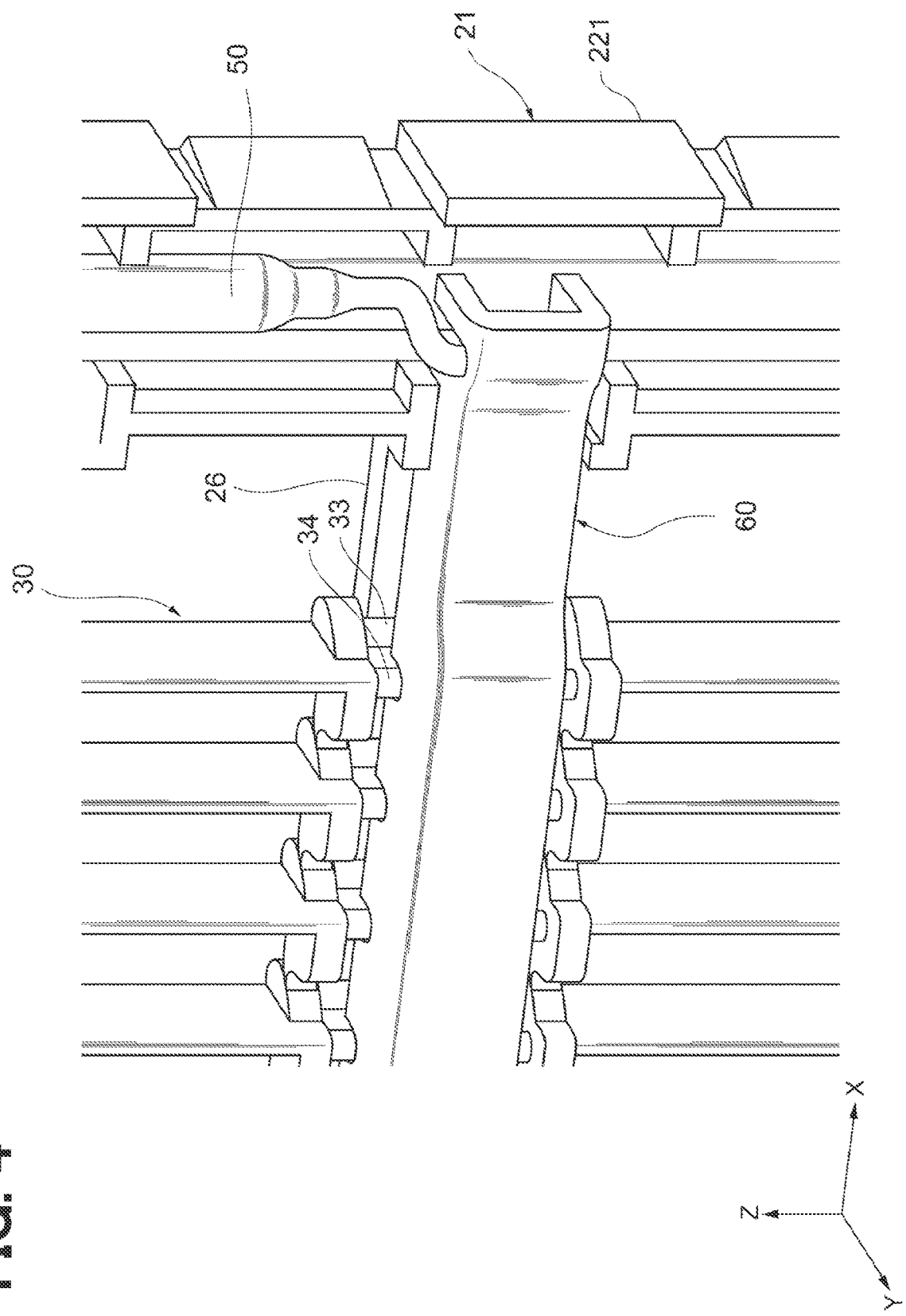
FIG. 4 is an enlarged view showing a connecting portion between a link member and a shaft of the embodiment.

A link member 60 is further assembled to the lateral reinforcing frame piece 221. The link member 60 is formed so as to extend in the X axis direction. As shown in FIG. 4, the link member 60 is connected to a connecting portion 34 formed at one end of each blade 30. A lower end of the shaft 50 is coupled with an one end of the link member 60.

As shown in FIG. 2, the shaft 50 is arranged along the right frame piece 212 upward from a central portion of the right frame piece 212. The upper end of the shaft 50 projects from the upper surface of one end of the upper frame piece 210. A gear 51 is formed at the upper end of the shaft 50.

The actuator device 40 is fixed above one end of the upper frame piece 210 by a screw or the like. The actuator device 40 has a drive shaft which is meshed with the gear 51 of the shaft 50, and rotates the shaft 50 in response to an electric power supply. The plurality of blades 30 are operated to open or to close in response to a relative displacement of the link member 60 in the X axis direction with respect to the lateral reinforcing frame piece 221 caused by rotation of the shaft 50. That is, the link member 60 opens and closes the plurality of blades 30 by transmitting the rotational force of the shaft 50 to the plurality of blades 30. When the plurality of blades 30 are in open state, gaps are formed between the blades 30, so that the air can enter into the engine room 3 from the front opening 2 through the shutter device 10. When the plurality of blades 30 are in closed state, the gaps between the blades 30 are closed, so that the air flow from the front opening 2 to the engine room 3 is temporarily blocked.

Figure 5:
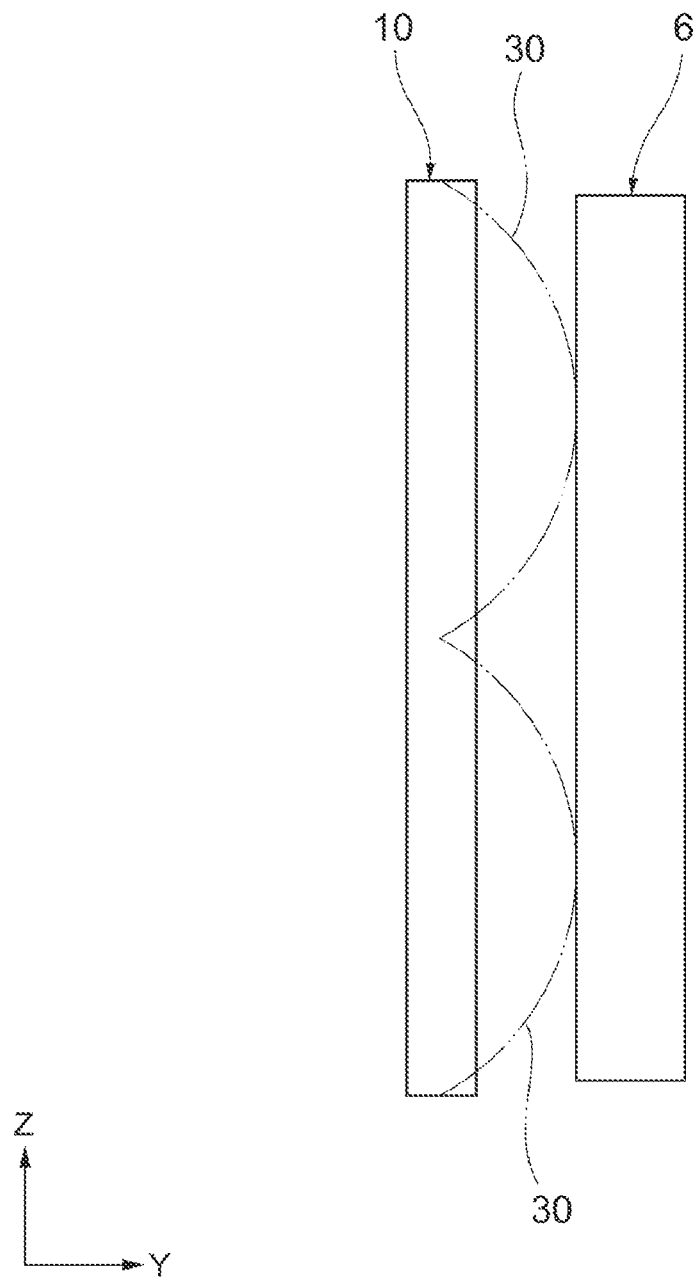
FIG. 5 is a diagram schematically showing deformation of a blade of a comparative example.
Figure 6:
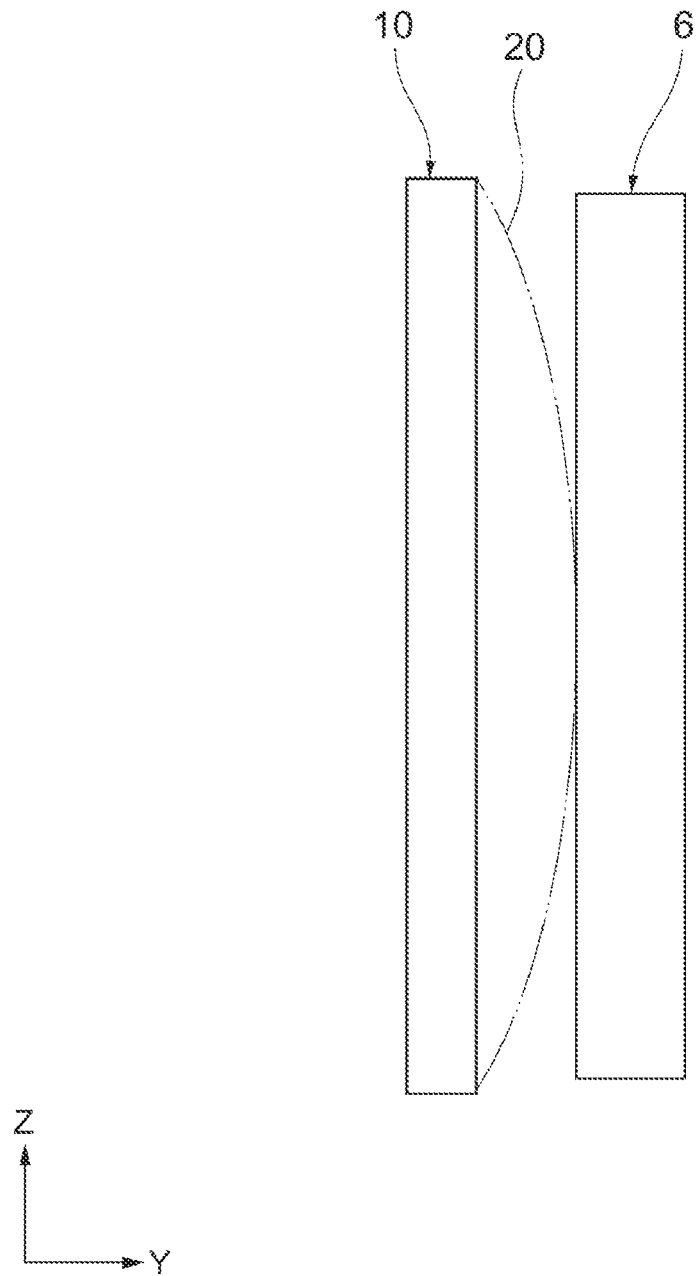
FIG. 6 is a diagram schematically showing deformation of a frame of a comparative example.

By the way, in the shutter device 10 described above, if the ram pressure is applied to the blade 30 due to the traveling wind of the vehicle C when the plurality of blades 30 are in the closed state, the blade 30 may be deformed so as to bend in the air flow direction Y as shown by a double-dot chain line in FIG. 5. Further, since force applied to the blade 30 by the ram pressure is transmitted to the frame member 20, the frame member 20 may be deformed so as to bend in the air flow direction Y as shown by the double-dot chain line in FIG. 6. When the frame member 20 and the blades 30 are deformed as shown in FIGS. 5 and 6, the blades 30 may be disassembled from the frame member 20. Further, if the frame member 20 and the blade 30 are deformed as shown in FIG. 5 and FIG. 6, the frame member 20 and the blade 30 may come into contact with the heat exchanger 6 arranged on the downstream side of the air flow direction Y with respect to the shutter device 10. As a result, the frame member 20, the blade 30, or the heat exchanger 6 may be damaged.

Figure 7:
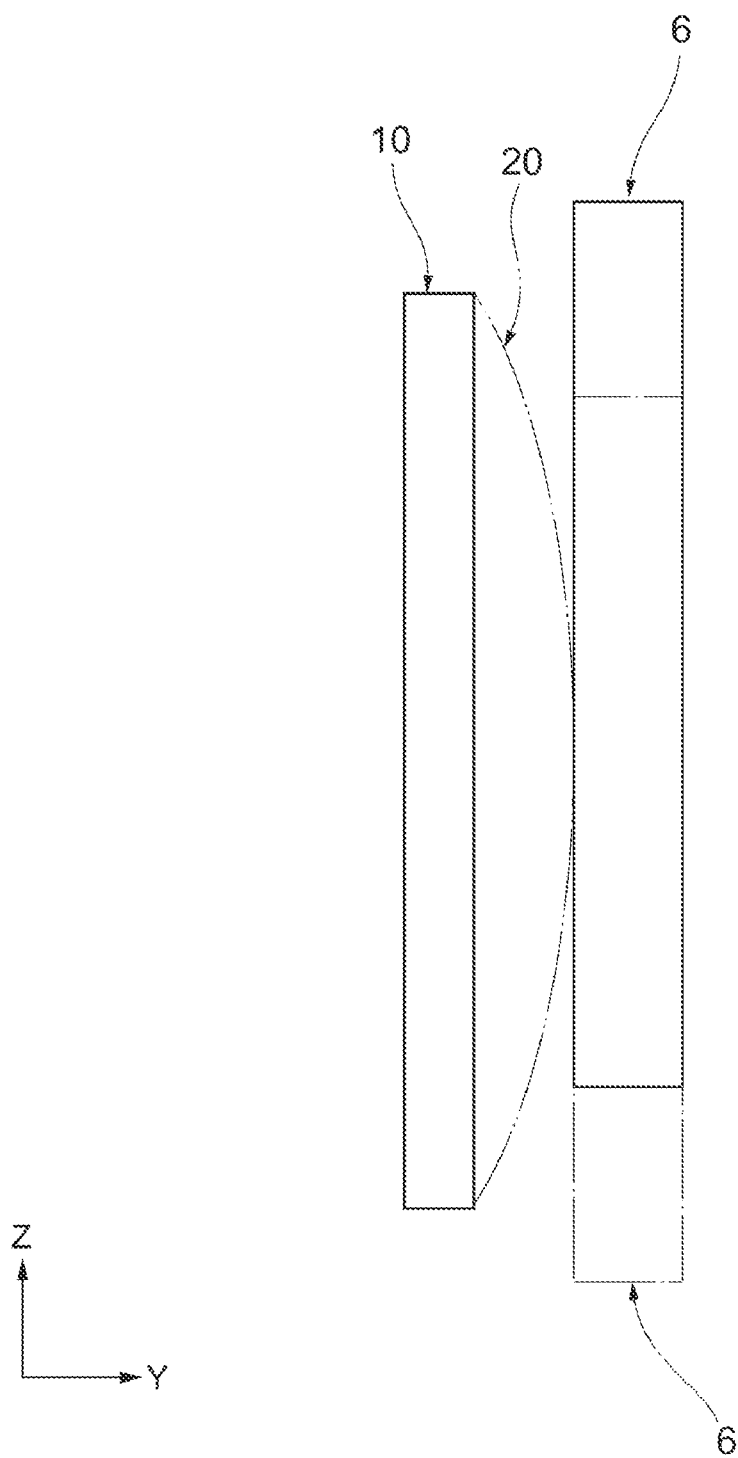
FIG. 7 is a diagram schematically showing deformation of a blade of a comparative example.

On the other hand, the heat exchanger 6 and the shutter device 10 may vibrate in the Z axis direction, i.e., in the vertical direction of the vehicle C due to the vibration of the vehicle C. Since the shapes and weights of the heat exchanger 6 and the shutter device 10 are different, the heat exchanger 6 and the shutter device 10 vibrate in different modes. Therefore, the relative positional relationship between the heat exchanger 6 and the shutter device 10 is deviated. When the heat exchanger 6 vibrates with a larger amplitude than the shutter device 10, if the frame member 20 comes into contact with the heat exchanger 6, as shown in FIG. 7, the frame member 20 receives a large frictional force at a contact portion with the heat exchanger 6. As a result, the frame member 20 or the heat exchanger 6 may be damaged earlier than the life at the contact portion.

Figure 8:
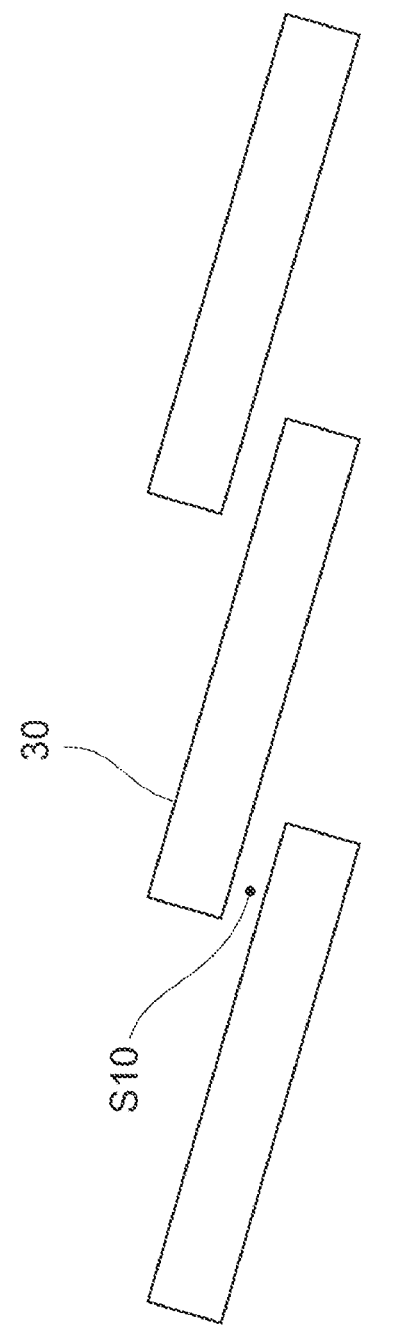
FIG. 8 is a diagram schematically showing deformation of a blade in a closed state of a comparative example.

Further, as shown in FIG. 8, when the plurality of blades 30 are in the closed state, air flows through the narrow gap S10 between the adjacent blades 30. When air flows through the narrow gap S10, since a flow velocity of the air increases, a negative pressure is generated in the gap S10. When the blade 30 is deformed to the downstream side in the air flow direction Y due to this negative pressure, the negative pressure generated in the gap S10 becomes smaller. As a result, the blade 30 returns to its original shape. When the blade 30 returns to its original shape, a negative pressure is generated again in the gap S10. As a result, the blade 30 is deformed. In this way, the blade 30 repeatedly deforms due to the negative pressure generated in the gap S10 between the blades 30. The blades 30 are vibrated in a self-excited manner. Such self-excited vibration of the blade 30 causes noise. Further, the self-excited vibration of the blade 30 may be transmitted to the other parts of the shutter device 10 and the other parts may vibrate, as a result, abrasion of various parts of the shutter device 10 may be facilitated as a problem.

As shown in FIG. 2, a bracket 80 and a rod-shaped member 90 are assembled to the frame member 20 in the shutter device 10 of the present embodiment, in order to suppress the deformation of the blade 30 as shown in FIG. 5 and the deformation of the frame 20 shown in FIG. 6 and FIG. 7. The rod-shaped member 90 also functions as a member for suppressing self-excited vibration of the blade 30 as shown in FIG. 8. In the shutter device 10, disassembling of the blade 30 from the frame member 20 is suppressed by suppressing deformation of the blade 30 and the frame member 20 by the bracket 80 and the rod-shaped member 90. That is, in the present embodiment, the bracket 80 and the rod-shaped member 90 correspond to auxiliary members that assist support of the blade 30 with respect to the frame member 20.

Next, the details of the structure of the bracket 80 and the rod-shaped member 90 are described.

As shown in FIG. 2, the brackets 80 are arranged on connection portions, which includes a connecting portion between a central portion of the right frame piece 212 and a right end portion of the lateral reinforcing frame piece 221, a connecting portion between a central portion of the left frame piece 213 and a left end of the lateral reinforcing frame piece 221, and a connecting portion between a central portion of the vertical reinforcing frame piece 220 and a central portion of the lateral reinforcing frame piece 221. Since a shape of the brackets 80 arranged on portions is identical, the structure of the bracket 80 provided at the connecting portion between the central portion of the vertical reinforcing frame piece 220 and the central portion of the lateral reinforcing frame piece 221 is described as a representative one.

Figure 9:
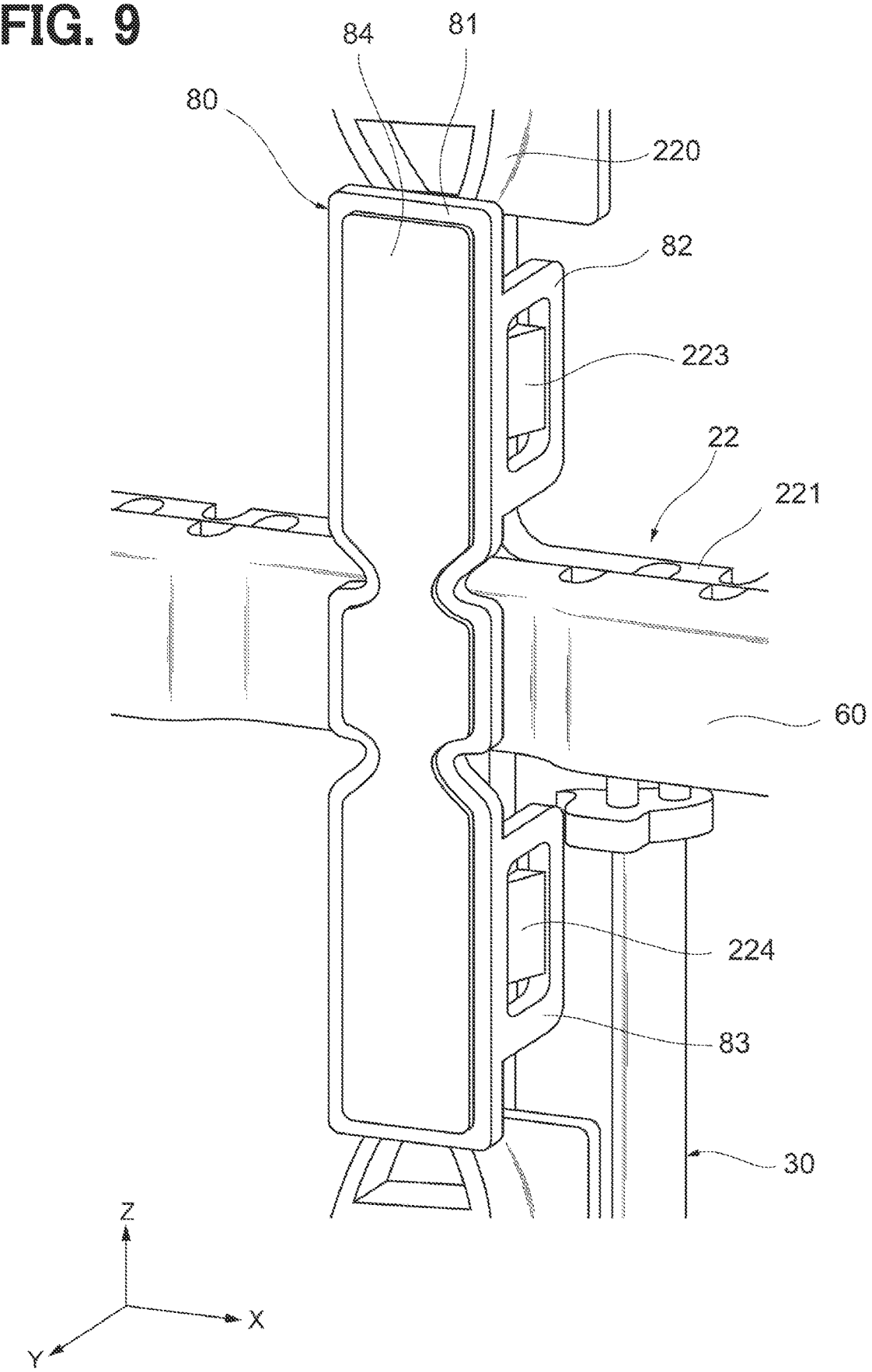
FIG. 9 is a perspective view showing a bracket in the shutter device of the embodiment.

As shown in FIG. 9, the bracket 80 reinforces the connecting portion between the central portion of the vertical reinforcing frame piece 220 and the central portion of the lateral reinforcing frame piece 221. The bracket 80 is made of a resin material.

The bracket 80 is assembled to an outer surface of the reinforcing frame piece 22 located on the downstream side in the air flow direction Y. The bracket 80 has a base portion 81 formed in a plate shape, and engaging portions 82 and 83 formed so as to extend in a direction parallel to the Y axis direction from each of both side surfaces of the base portion 81.

Claw members 223 are formed on both side surfaces in the X axis direction on the vertical reinforcing frame piece 220 at portions above the connecting portion with the lateral reinforcing frame pieces 221. The claw member 223 is engaged with the engaging member 82 of the bracket 80 in the Y axis direction.

Figure 10:
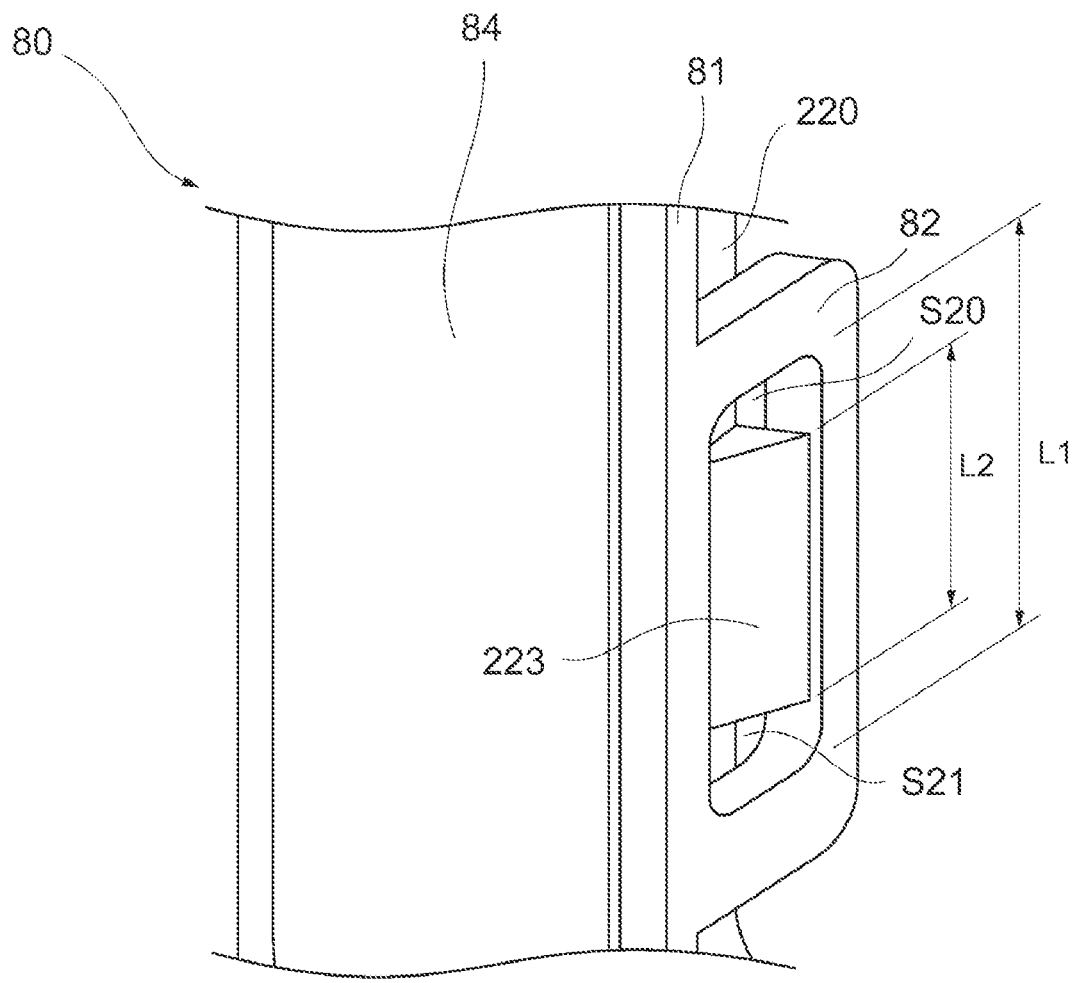
FIG. 10 is an enlarged view showing a connecting portion between a bracket and a frame member in the shutter device of the embodiment.

As shown in FIG. 10, a length L1 of an aperture of the engaging member 82 of the bracket 80 in the Z axis direction is longer than a length L2 of the claw member 223 in the Z axis direction. As a result, a gap S20 is formed between an upper wall inner surface of the engaging member 82 of the bracket 80 and the claw member 223 of the reinforcing frame piece 22. Further, a gap S21 is also formed between a lower wall inner surface of the engaging member 82 of the bracket 80 and the claw member 223 of the reinforcing frame piece 22. These gaps S20 and S21 enable a relative displacement of the bracket 80 in the z axis direction with respect to the reinforcing frame piece 22.

As shown in FIG. 9, similar claw members 224 are formed on both side surfaces in the X axis direction on the vertical reinforcing frame piece 220 at portions below the connecting portion with the lateral reinforcing frame pieces 221.

The base portion 81 of the bracket 80 is arranged so as to face a central portion of the link member 60. As a result, the bracket 80 holds the central portion of the link member 60 with respect to the lateral reinforcing frame piece 221.

By the way, if the link member 60 is disassembled from the lateral reinforcing frame piece 221 due to the deformation of the frame member 20, the blades 30 supported by the lateral reinforcing frame piece 221 and the link member 60 may also be disassembled. In this regard, in the shutter device 10 of the present embodiment, as shown in FIG. 9, the bracket 80 holds the link member 60 with respect to the lateral reinforcing frame pieces 221. As a result, since it is possible to suppress disassembling of the link member 60 from the lateral reinforcing frame piece 221, it is possible to suppress disassembling of the blades 30 from the frame member 20. As described above, the bracket 80 functions as an auxiliary member for suppressing disassemble of the blades 30 from the frame member 20.

As shown in FIG. 9, an elastic body 84 such as a rubber member is integrally molded on a surface of the bracket 80.

That is, the bracket 80 is made of a two-color molded product formed of a resin material and an elastic material such as rubber.

Figure 11:
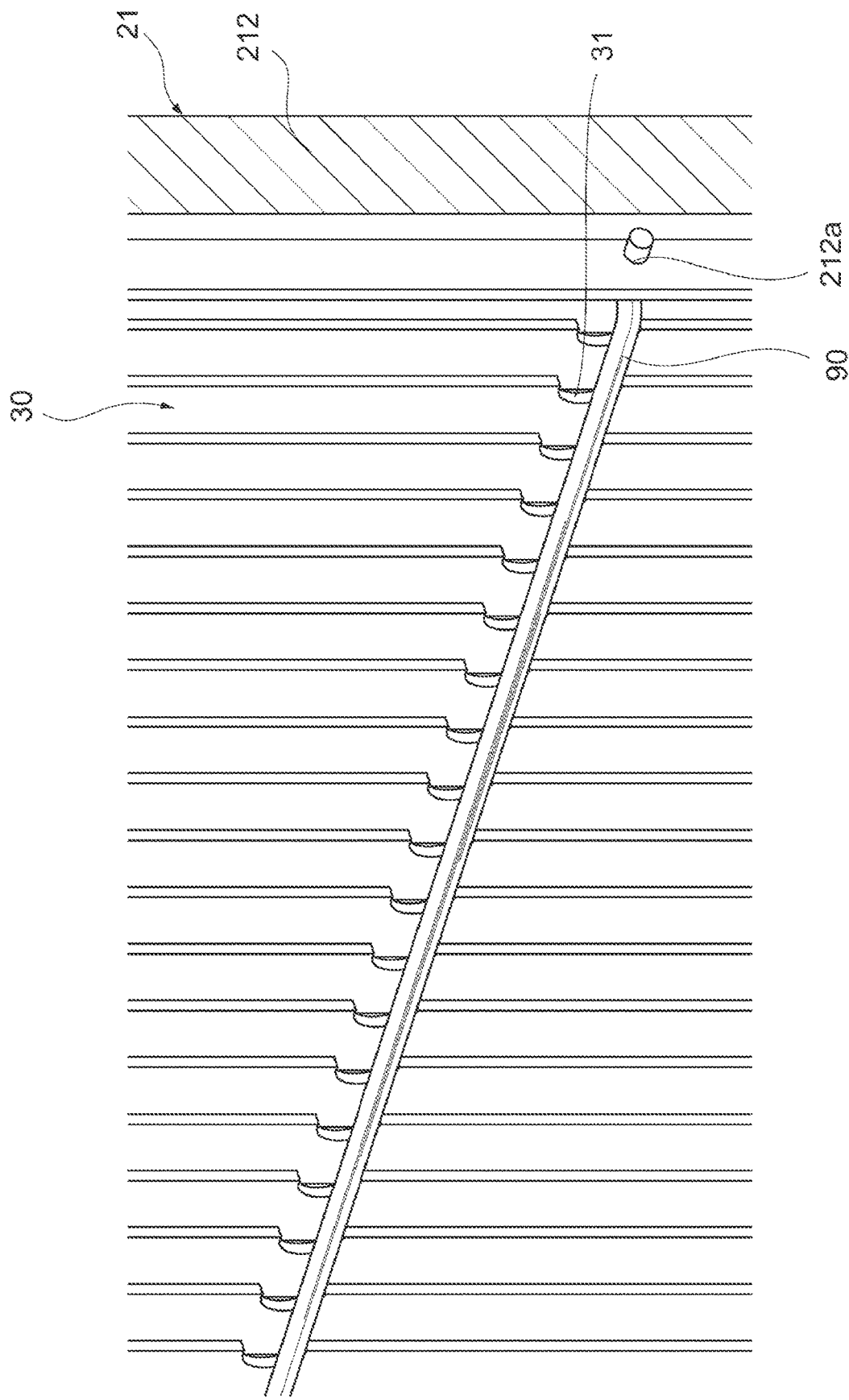
FIG. 11 is a perspective view showing a blade and a rod-shaped member of the embodiment.
Figure 12:
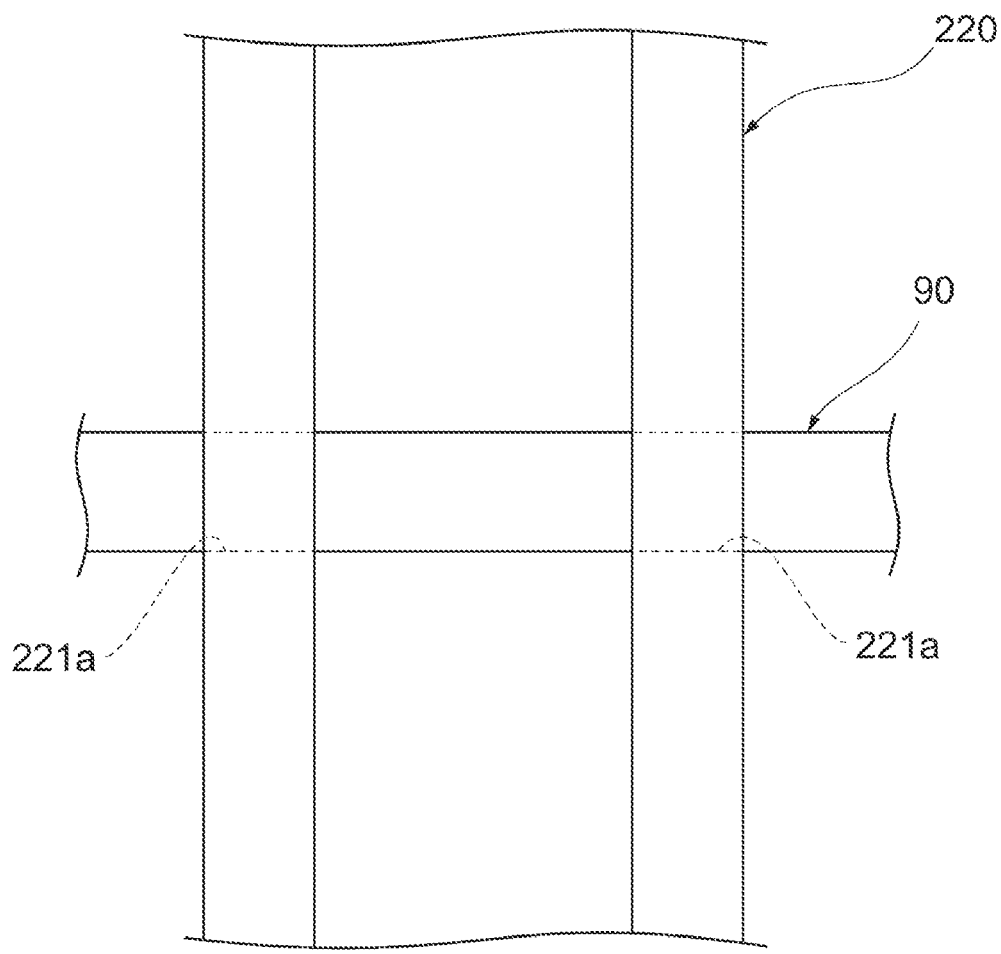
FIG. 12 is an enlarged view showing a connecting portion between a central portion of a rod-shaped member and a frame member in the shutter device of the embodiment.

As shown in FIG. 2, the rod-shaped members 90 are arranged on a position facing central portions of the plurality of blades 30 arranged in an upper region of the frame member 20 and arranged on a position facing central portions of the plurality of blades 30 arranged in a lower region of the frame member 20. As shown in FIG. 11, one end of the rod-shaped member 90 is inserted and fixed in an insertion hole 212a formed on the right frame piece 212. Similarly, the other end of the rod-shaped member 90 is inserted and fixed in an insertion hole formed on the left frame piece 213. As shown in FIG. 12, a central portion of the rod-shaped member 90 is held by the lateral reinforcing frame piece 221 by being inserted into insertion holes 221a formed on the vertical reinforcing frame piece 220.

Figure 13:
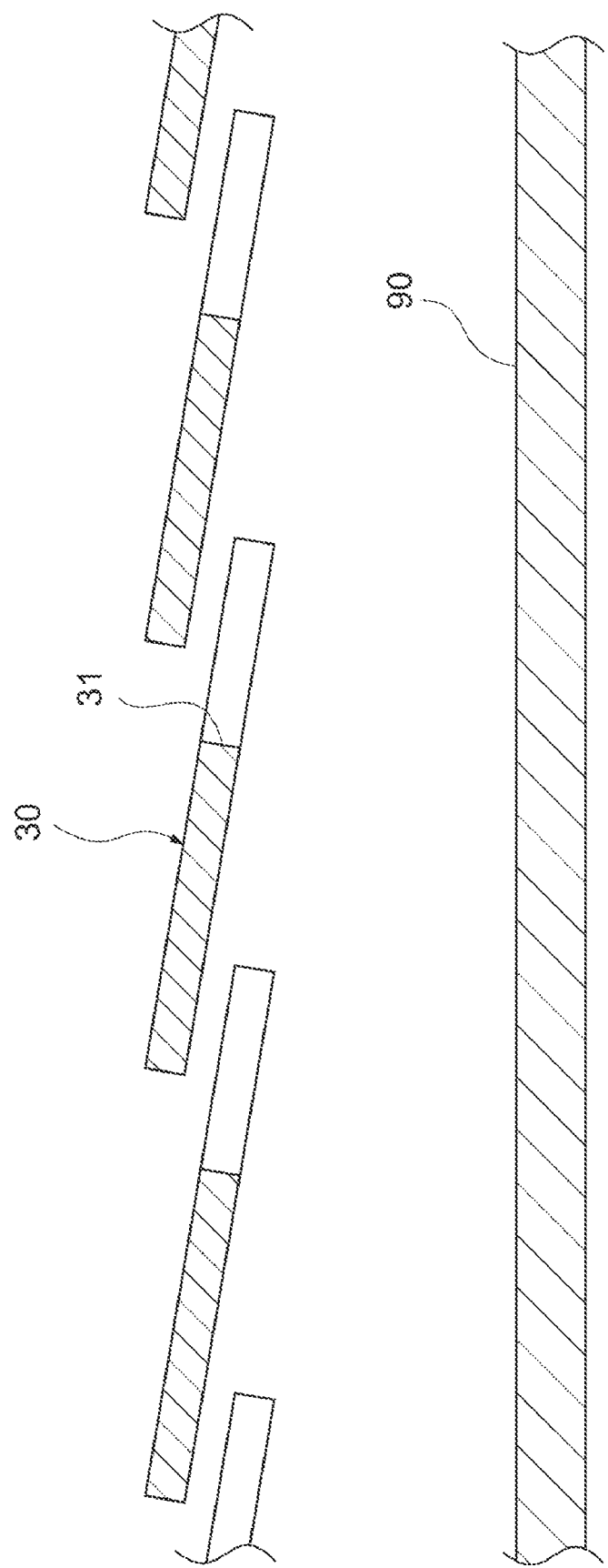
FIG. 13 is a cross-sectional view showing a blade and a rod-shaped member of the embodiment.
Figure 14:
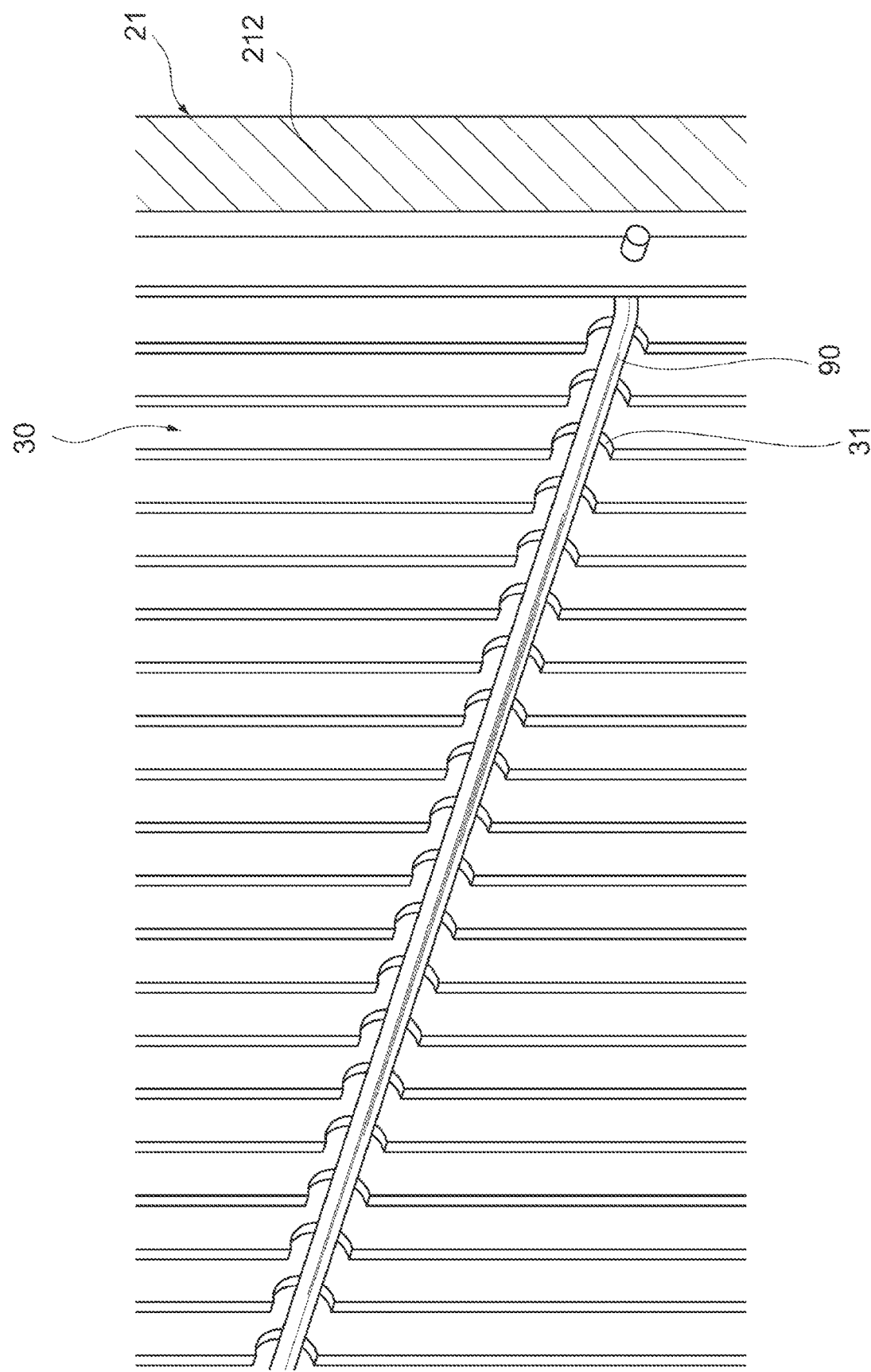
FIG. 14 is a perspective view showing a blade and a rod-shaped member of the embodiment.
Figure 15:
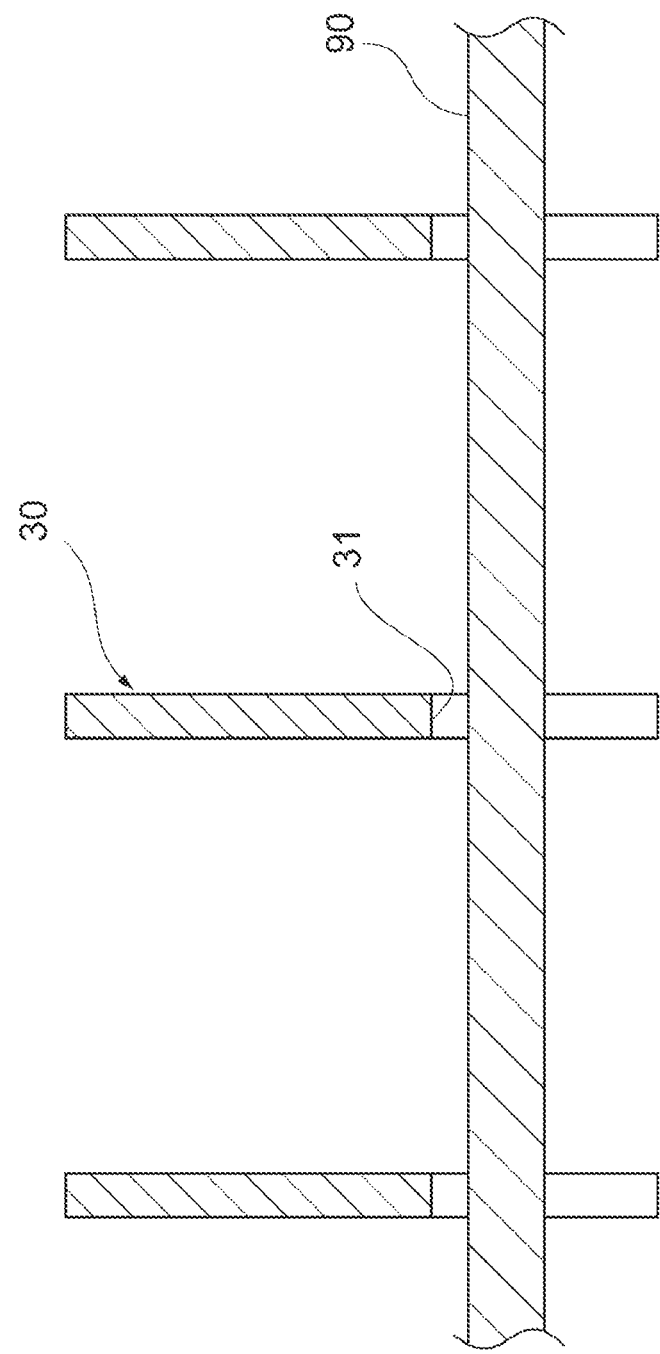
FIG. 15 is a cross-sectional view showing a blade and a rod-shaped member of the embodiment.

As shown in FIGS. 11 and 13, the rod-shaped member 90 is arranged at a position facing the notch shape 31 of each one of the blades 30. As shown in FIGS. 14 and 15, when each blade 30 is in the open state, the rod-shaped member 90 is placed and held so as to be inserted into the notch shape 31 of each blade 30.

The rod-shaped member 90 functions as an auxiliary member for suppressing disassemble of the blade 30 from the frame member 20 by being assembled to the right frame piece 212, the left frame piece 213, and the vertical reinforcing frame pieces 221 to suppress deformation of the blade 30 to the downstream side in the air flow direction Y.

Further, as shown in FIGS. 11 and 13, when each blade 30 is in the closed state and each blade 30 is deformed to the downstream side in the air flow direction Y due to the ram pressure, self-excited vibration, or the like, each blade 30 comes into contact with the rod-shaped member 90. As a result, further deformation of each blade 30 is regulated by the rod-shaped member 90. The rod-shaped member 90 functions as an auxiliary member for suppressing disassemble of the blade 30 from the frame member 20 by suppressing further deformation of the blade 30 to the downstream side in the air flow direction Y in this way.

Further, since the deformation of the blades 30 to the downstream side in the air flow direction Y is suppressed by the rod-shaped member 90, it is possible to avoid that each blade 30 comes into contact with the heat exchanger 6 arranged on the downstream side in the air flow direction Y. Further, since the self-excited vibration of each blade 30 can be suppressed by contacting each blade 30 with the rod-shaped member 90, it is possible to suppress noise, abrasion of various parts of the shutter device 10 and the like caused by the self-excited vibration of each blade 30.

When the frame member 20 is deformed by the ram pressure, the most easily deformed portion of the frame member 20 is central portions of the frame member 20. If the central portion of the frame member 20 is significantly deformed to the downstream side in the air flow direction Y, the bracket 80 provided on the central portion of the frame member 20 comes into contact with the heat exchanger 6. At that time, since the elastic body 84 provided on the surface of the bracket 80 comes into contact with the heat exchanger 6, it is possible to absorb an impact force applied to the frame member 20 by the elastic body 84 when the frame member 20 comes into contact with the heat exchanger 6. Therefore, it is possible to lower the impact force applied to the frame member 20.

Further, in a situation where the heat exchanger 6 is vibrating due to a vibration of the vehicle C, if the bracket 80 comes into contact with the vibrating heat exchanger 6, due to a frictional force generated between the elastic body 84 of the bracket 80 and the heat exchanger 6, the bracket 80 is displaced integrally with the heat exchanger 6 in the vertical direction of the vehicle C, that is, in the Z axis direction. At this time, since the gaps are formed in the Z axis direction between the engaging member 82 of the bracket 80 and the claw member 223 of the frame member 20, and between the engaging member 83 of the bracket 80 and the claw member 224 of the frame member 20, it is possible to relatively displace the bracket 80 with respect to the frame member 20. Since the bracket 80 can absorb displacement differences between the vibrating heat exchanger 6 and the frame member 20 by being displaced the bracket 80 relative to the frame member 20, it is possible to suppress excessive frictional force applied to the frame member 20 at the contact portion of the heat exchanger 6. Therefore, it is possible to prevent early damage to the frame member or the heat exchanger.

According to the shutter device 10 of this embodiment described above, operations and effects described in the following (i) to (xi) can be obtained.

(i) The bracket 80 and the rod-shaped member 90 are assembled to the frame member 20 to assist the support of the blade 30 with respect to the frame member 20. According to such a configuration, it is possible to suppress disassembling of the blade 30 from the frame member 20.

(ii) The bracket 80 holds the link member 60 with respect to the lateral reinforcing frame piece 221. As a result, it is possible to suppress disassembling of the blade 30 caused by a disassembling of the link member 60 from the lateral reinforcing frame piece 221.

(iii) The bracket 80 is assembled on the outer surface of the frame member 20 located on the downstream side in the air flow direction Y. According to such a configuration, the bracket 80 can effectively suppress the deformation of the frame member 20 to the downstream side in the air flow direction Y.

(iv) The elastic body 84 is integrally provided on the surface of the bracket 80. As a result, the impact force applied to the frame member 20 or the heat exchanger 6 when the frame member 20 comes into contact with the heat exchanger 6 can be absorbed by the elastic body 84, so that it is possible to lower the impact force applied to the frame member 20.

(v) In other words, the gaps are formed in the Z axis direction, i.e., in a direction orthogonal to the air flow direction Y, between the engaging member 82 of the bracket 80 and the claw member 223 of the frame member 20, and between the engaging member 83 of the bracket 80 and the claw member 224 of the frame member 20. According to such a configuration, since the bracket 80 can absorb the displacement differences between the heat exchanger 6 and the frame member 20 when the bracket 80 comes into contact with the heat exchanger 6, it is possible to prevent an excessive frictional force from being applied to the frame member 20 or the heat exchanger 6 at the contact portion.

(vi) The shutter device 10 is provided with a plurality of brackets 80 and a plurality of rod-shaped members 90. As a result, the blades 30 can be supported more reliably with respect to the frame member 20.

(vii) The bracket 80 arranged at the right end of the lateral reinforcing frame piece 221 further has a function to hold the shaft 50 with respect to the frame member 20. According to such a configuration, the bracket 80 can prevent the shaft 50 from being disassembled from the frame member 20.

(viii) The rod-shaped member 90 further suppresses the deformation of the blade 30 toward the downstream side in the air flow direction Y. According to such a configuration, the rod-shaped member 90 can prevent the blade 30 from coming into contact with the heat exchanger 6 adjacent to the shutter device 10. Further, since the self-excited vibration of the blade 30 can be suppressed by the rod-shaped member 90, it is possible to suppress noise and abrasion of parts on the blades 30 caused by the self-excited vibration.

(ix) The rod-shaped member 90 is arranged so as to face the plurality of blades 30 on the downstream side in the air flow direction Y and extends in the X axis direction, and is assembled to the frame member 20. According to such a rod-shaped member 90, it is possible to easily provide a member capable of suppressing deformation of the blade 30.

(x) The blade 30 is formed with a notch shape 31 which avoids interference with the rod-shaped member 90 in the open state. According to such a configuration, since the rod-shaped member 90 can be arranged so as to be close to the blade 30, the deformation of the blade 30 can be easily suppressed by the rod-shaped member 90.

(xi) The rod-shaped member 90 is arranged so as to face central portions in longitudinal directions of the plurality of blades. According to such a configuration, since the deformation of the most easily deformable portion of the blade 30 can be suppressed by the rod-shaped member 90, the deformation of the blade 30 can be effectively suppressed.

The embodiments described above can be also implemented in the following forms.

Figure 16:
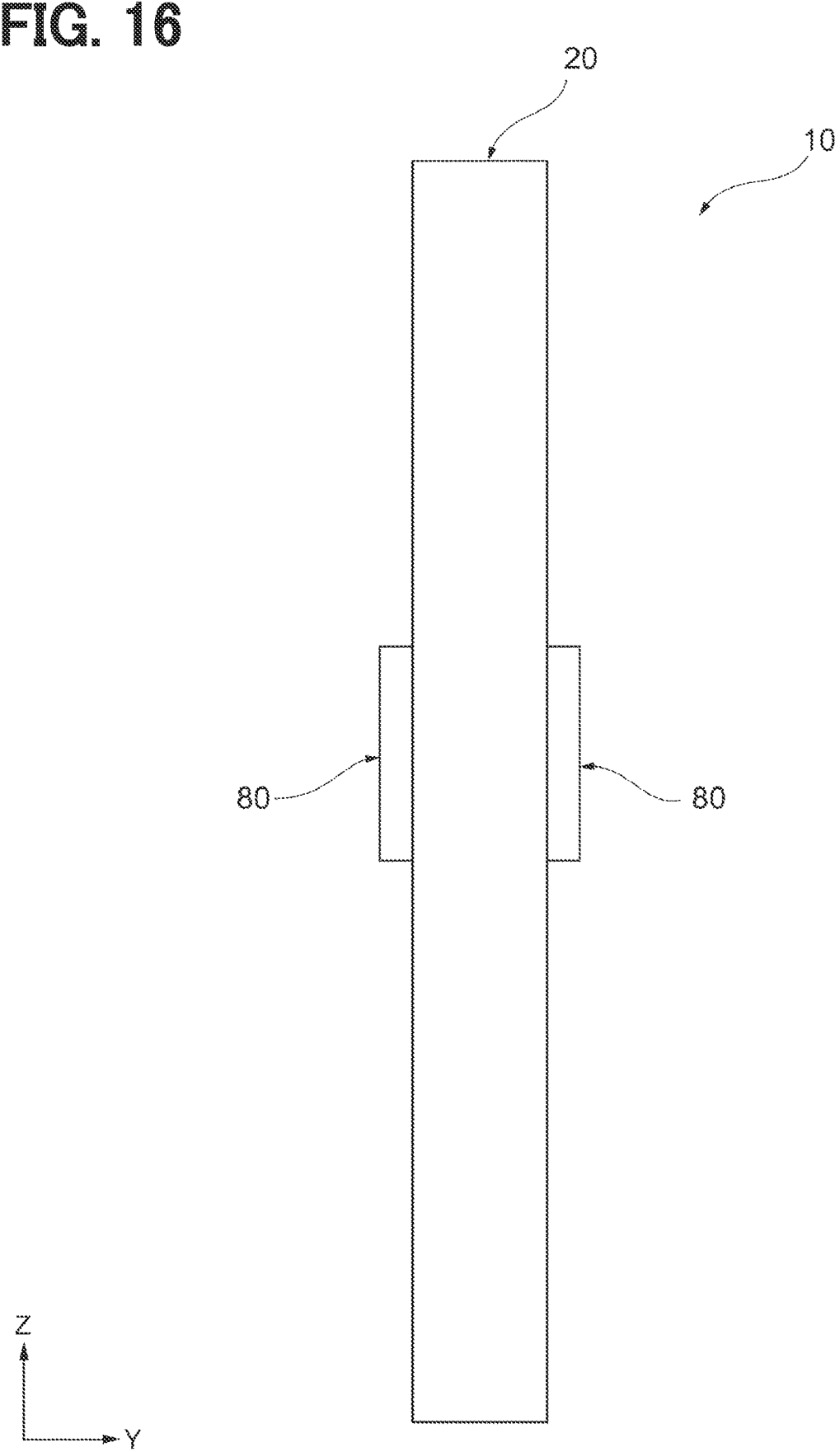
FIG. 16 is a side view showing a shutter device of another embodiment.

As shown in FIG. 16, the bracket 80 may be assembled not only on the outer surface of the frame member 20 located on the downstream side in the air flow direction but also on the outer surface of the frame 20 located on the upstream side in the air flow direction.

The rod-shaped member 90 may be arranged so as to face portions other than the central portion in the longitudinal direction of the plurality of blades 30.

The shutter device 10 may be provided with only one of the bracket 80 and the rod-shaped member 90.

The present disclosure is not limited to the specific examples described above. The specific examples described above which have been appropriately modified in design by those skilled in the art are also encompassed in the scope of the present disclosure so far as the modified specific examples have the features of the present disclosure. Each element included in each of the specific examples described above, and the placement, condition, shape, and the like of the element are not limited to those illustrated, and can be modified as appropriate. The combinations of the elements in each of the specific examples described above can be changed as appropriate, as long as it is not technically contradictory.

What is claimed is:

1. A shutter device for a vehicle, comprising:
a frame member formed in a casing shape and in which air introduced from an opening of the vehicle flows through space within the casing;
a plurality of blades supported by the frame member in a rotatable manner to open and close the space within the casing of the frame member;
an actuator device which opens and closes the blades; and
an auxiliary member which is assembled to the frame member and assists supporting the blades with respect to the frame member, wherein
the plurality of blades are arranged side by side in a predetermined direction which is a direction orthogonal to a longitudinal direction thereof,
the auxiliary member is a rod-shaped member which is formed so as to extend in the predetermined direction, is assembled to the frame member, and is arranged to face the plurality of blades at downstream sides in a direction of the air flow,
each one of the plurality of blades is rotatable about an axis in the longitudinal direction of the blade,
the auxiliary member extends in the predetermined direction orthogonal to the longitudinal direction, and
the plurality of blades and the auxiliary member are located so that each one of the plurality of blades comes into contact with the auxiliary member to suppress deformation of the plurality of blades when each one of the plurality of blades is deformed to the downstream side in the direction of the air flow.

2. The shutter device claimed in claim 1, wherein
each one of the plurality of blades is formed with a notch shape which avoids interference with the auxiliary member in an open state.

3. The shutter device claimed in claim 1, wherein
the auxiliary member is arranged so as to face central portions in longitudinal directions of the plurality of blades.

4. The shutter device claimed in claim 1, wherein
the plurality of blades are supported by shaft portions at both ends in the longitudinal direction.

5. The shutter device claimed in claim 1, wherein
the plurality of blades includes at least three blades arranged in parallel to each other along the predetermined direction orthogonal to the longitudinal direction of the blades.

6. A shutter device for a vehicle, comprising:
a frame member formed in a square casing shape and in which air introduced from an opening of the vehicle flows through space within the casing;
a plurality of blades supported by the frame member in a rotatable manner to open and close the space within the casing of the frame member;
an actuator device which opens and closes the blades; and
an auxiliary member which is assembled to the frame member and assists supporting the blades with respect to the frame member, wherein
the plurality of blades are arranged side by side in a predetermined direction which is a direction orthogonal to a longitudinal direction of the plurality of blades,
the auxiliary member is a member which is formed so as to extend in the predetermined direction, is assembled to the frame member, and is arranged to face the plurality of blades at downstream sides in a direction of the air flow,
each one of the plurality of blades is rotatable about an axis in the longitudinal direction of the blade,
the auxiliary member extends in the predetermined direction orthogonal to the longitudinal direction, and
the plurality of blades and the auxiliary member are located so that each one of the plurality of blades comes into contact with the auxiliary member to suppress deformation of the plurality of blades when each one of the plurality of blades is deformed to the downstream side in the direction of the air flow.

7. The shutter device claimed in claim 6, wherein
each one of the plurality of blades is formed with a notch shape which avoids interference with the auxiliary member in an open state.

8. The shutter device claimed in claim 6, wherein
the auxiliary member is arranged so as to face central portions in longitudinal directions of the plurality of blades.

9. The shutter device claimed in claim 6, wherein the plurality of blades are supported by shaft portions at both ends in the longitudinal direction.

10. The shutter device claimed in claim 6, wherein the plurality of blades includes at least three blades arranged in parallel to each other along the predetermined direction orthogonal to the longitudinal direction of the blades.

\* \* \* \* \*